US012420443B1

(12) United States Patent
Wei

(10) Patent No.: US 12,420,443 B1
(45) Date of Patent: Sep. 23, 2025

(54) BREAD SLICER

(71) Applicant: Zixu Wei, Henan (CN)

(72) Inventor: Zixu Wei, Henan (CN)

( * ) Notice: Subject to any disclaimer, the term of this patent is extended or adjusted under 35 U.S.C. 154(b) by 0 days.

(21) Appl. No.: 19/231,608

(22) Filed: Jun. 9, 2025

(51) Int. Cl.
*B26D 1/18* (2006.01)
*B26D 5/10* (2006.01)
*B26D 7/00* (2006.01)
*B26D 7/26* (2006.01)

(52) U.S. Cl.
CPC ................. *B26D 1/18* (2013.01); *B26D 5/10* (2013.01); *B26D 7/0006* (2013.01); *B26D 7/2635* (2013.01); *B26D 2210/06* (2013.01)

(58) Field of Classification Search
CPC . B26D 7/12; B26D 1/153; B26D 1/18; B26D 5/10; B26D 7/0006; B26D 7/2635; B26D 2210/06; B26D 3/18; B26D 7/01; Y10T 83/6515; Y10T 83/205
See application file for complete search history.

(56) References Cited

U.S. PATENT DOCUMENTS 1,954,032 A * 4/1934 Wood ........................ B26D 7/02 83/717
1,954,043 A * 4/1934 Fryer ........................ B26D 7/01 83/730
2,004,602 A * 6/1935 Folk .......................... B26D 7/01 83/451
2,438,937 A * 4/1948 Metzler .................... B26D 7/32 83/167
2,598,740 A * 6/1952 Zimmermann .......... B26D 7/12 83/717
2,611,406 A * 9/1952 Preble, Jr. ................ B26D 7/00 83/717
2,663,341 A * 12/1953 Grove .................... B26D 1/143 83/717
2,851,074 A * 9/1958 Talge ....................... B26D 7/01 83/719
2,855,166 A * 10/1958 Green .................... B26D 1/143 248/678

(Continued)

FOREIGN PATENT DOCUMENTS

DE 974123 C * 9/1960
DE 20007571 U1 * 7/2000 ............... B26D 7/01
WO WO-9806547 A1 * 2/1998 ............... B26D 7/01

OTHER PUBLICATIONS

DE_20007571_U1 (Year: 2000).*
WO_9806547_A1 (Year: 1998).*
DE-974123-C (Year: 1960).*

*Primary Examiner* — Jonathan G Riley
(74) *Attorney, Agent, or Firm* — S.J. Intellectual Property LTD.

(57) ABSTRACT

A bread slicer includes a bottom plate, a cutting assembly and a barrier assembly. The cutting assembly includes a cutter, and the barrier assembly includes a sliding plate, a baffle, a guiding structure and a knob. The sliding plate is slidably arranged above the bottom plate. The baffle is connected to the sliding plate. The guiding structure is used to limit a sliding direction of the sliding plate on the bottom plate. By turning the knob, the sliding plate is driven to move in the sliding direction, allowing the baffle to selectively adjust a distance between a plate surface of the baffle and a cutting surface where the cutter is located.

18 Claims, 17 Drawing Sheets

(56) References Cited

U.S. PATENT DOCUMENTS

| | | | | | |
|---|---|---|---|---|---|
| 2,859,785 | A * | 11/1958 | Stolbach | B26D 1/15 83/717 |
| 3,002,543 | A * | 10/1961 | Weiner | B26D 1/15 83/437.1 |
| 3,146,814 | A * | 9/1964 | Anecki | B26D 7/00 83/717 |
| 3,613,754 | A * | 10/1971 | Hartley | B26D 1/153 99/589 |
| 4,273,013 | A * | 6/1981 | Artin | B26D 7/225 83/167 |
| 4,580,477 | A * | 4/1986 | Flammann | B26D 7/225 83/400 |
| 5,477,760 | A * | 12/1995 | Kuchler | B26D 7/01 83/717 |
| 5,970,840 | A * | 10/1999 | Yan | B26D 7/01 83/717 |
| 6,119,566 | A * | 9/2000 | Yan | B26D 7/01 83/717 |
| 7,270,481 | B1 * | 9/2007 | Chang | B26D 7/01 384/58 |
| 12,097,630 | B2 | 9/2024 | Korn et al. | |
| 2009/0133552 | A1 * | 5/2009 | McGuffin-Noll | B26D 7/01 83/225 |
| 2009/0151535 | A1 * | 6/2009 | Crookton | B26D 1/30 83/697 |

* cited by examiner

BREAD SLICER

TECHNICAL FIELD

An embodiment of the present disclosure relates to a bread slicer.

BACKGROUND

A bread slicer is a professional device used to evenly cut baked bread into slices, and is widely applied in home baking and commercial bakeries. The bread slicer drives a blade mechanically or electrically to cut the whole loaf of bread into uniform slices with a specified thickness, thereby enhancing the convenience for consumption.

SUMMARY

An embodiment of the present disclosure provides a bread slicer to solve at least one technical problem in the related art.

A bread slicer includes a bottom plate and a cutting assembly. The cutting assembly includes a support body and a cutter rotatably arranged on the support body. The support body is fixedly arranged above the bottom plate. A barrier assembly is arranged above the bottom plate. The barrier assembly includes: a sliding plate, slidably arranged above the bottom plate and provided with a first elongated hole and a second elongated hole, where the second elongated hole is arranged on a side of the first elongated hole in a longitudinal direction of the first elongated hole and between two ends in the longitudinal direction of the first elongated hole; a baffle, erected above the bottom plate, where one end of the baffle facing the bottom plate is connected to the sliding plate; a guiding structure, including a first guiding member and a second guiding member, where the first guiding member is arranged on the bottom plate, the second guiding member is arranged on the sliding plate, and the first guiding member and the second guiding member are in sliding fit to limit a sliding direction of the sliding plate on the bottom plate; and a knob, arranged above the sliding plate, where one side of the knob facing the sliding plate is provided with a main shaft and an eccentric shaft, an end of the main shaft extends through the first elongated hole and then is rotatably connected to the bottom plate, and the eccentric shaft is inserted into the second elongated hole and is capable of sliding in a longitudinal direction of the second elongated hole in a clearance fitting manner.

Turning the knob allows the eccentric shaft to rotate around the main shaft and drives the sliding plate to move in the sliding direction, such that the baffle can selectively adjusting a distance between a plate surface of the baffle and a cutting surface where the cutter is located.

In some embodiments, the first guiding member is arranged at one side of the bottom plate facing the sliding plate, and the first guiding member is provided with a shaft hole.

The second guiding member is arranged at one side of the first elongated hole of the sliding plate facing the bottom plate, and the main shaft of the knob extends through the first elongated hole and the shaft hole in sequence and then is rotatably connected to the bottom plate.

In some embodiments, the bottom plate is provided with an assembly hole, the main shaft of the knob extends into the assembly hole, a spring is sleeved onto an outer side of the main shaft, one end of the spring acts on an end of the main shaft, and the other end acts on the first guiding member.

In some embodiments, the first guiding member includes a first guide rail extending outward, and the second guiding member includes a first chute recessed inward.

In some embodiments, the first guide rail is detachably mounted above the bottom plate.

In some embodiments, a height of the first guide rail is greater than a depth of the first chute, allowing a gap to be reserved between the sliding plate and the bottom plate.

In some embodiments, the first guiding member includes a second chute recessed inward, and the second guiding member includes a second guide rail extending outward.

In some embodiments, a height of the second guide rail is greater than a depth of the second chute, allowing a gap to be reserved between the sliding plate and the bottom plate.

In some embodiments, the longitudinal direction of the second elongated hole is perpendicular to the longitudinal direction of the first elongated hole.

In some embodiments, the first elongated hole and the second elongated hole are separated from each other.

In some embodiments, the baffle is arranged at one end of the sliding plate facing the cutting surface.

In some embodiments, one end of the baffle facing the cutter is an arc-shaped end, and the arc-shaped end is capable of accommodating at least a part of the cutter.

In some embodiments, a suction cup is arranged below the bottom plate.

In some embodiments, the cutting assembly further includes a middle shaft. The middle shaft is rotatably connected to the support body. A first end and a second end of the middle shaft are located at two sides of the support body. A first gear is arranged at the first end, facing the support body, of the middle shaft. A coaxial second gear is arranged at one side of the cutter facing the support body. The second gear is fixedly connected to the cutter, and the second gear is meshed with the first gear.

In some embodiments, the second end of the middle shaft is provided with a crank and is fixedly connected to a first end of the crank, and a second end of the crank is provided with a handle.

In some embodiments, the bottom plate is provided with a bottom groove, and a part of the cutter is capable of being accommodated in the bottom groove.

In some embodiments, the sliding direction is perpendicular to an intersection line between the cutting surface and the bottom plate.

In some embodiments, the cutting surface is perpendicular to the bottom plate.

BRIEF DESCRIPTION OF THE DRAWINGS

The accompanying drawings, which constitute a part of the present disclosure, are used to provide a further understanding of the present disclosure. The illustrative embodiments of the present disclosure and their descriptions are intended to explain the present disclosure, and do not constitute undue limitations on the present disclosure.

Figure 1:
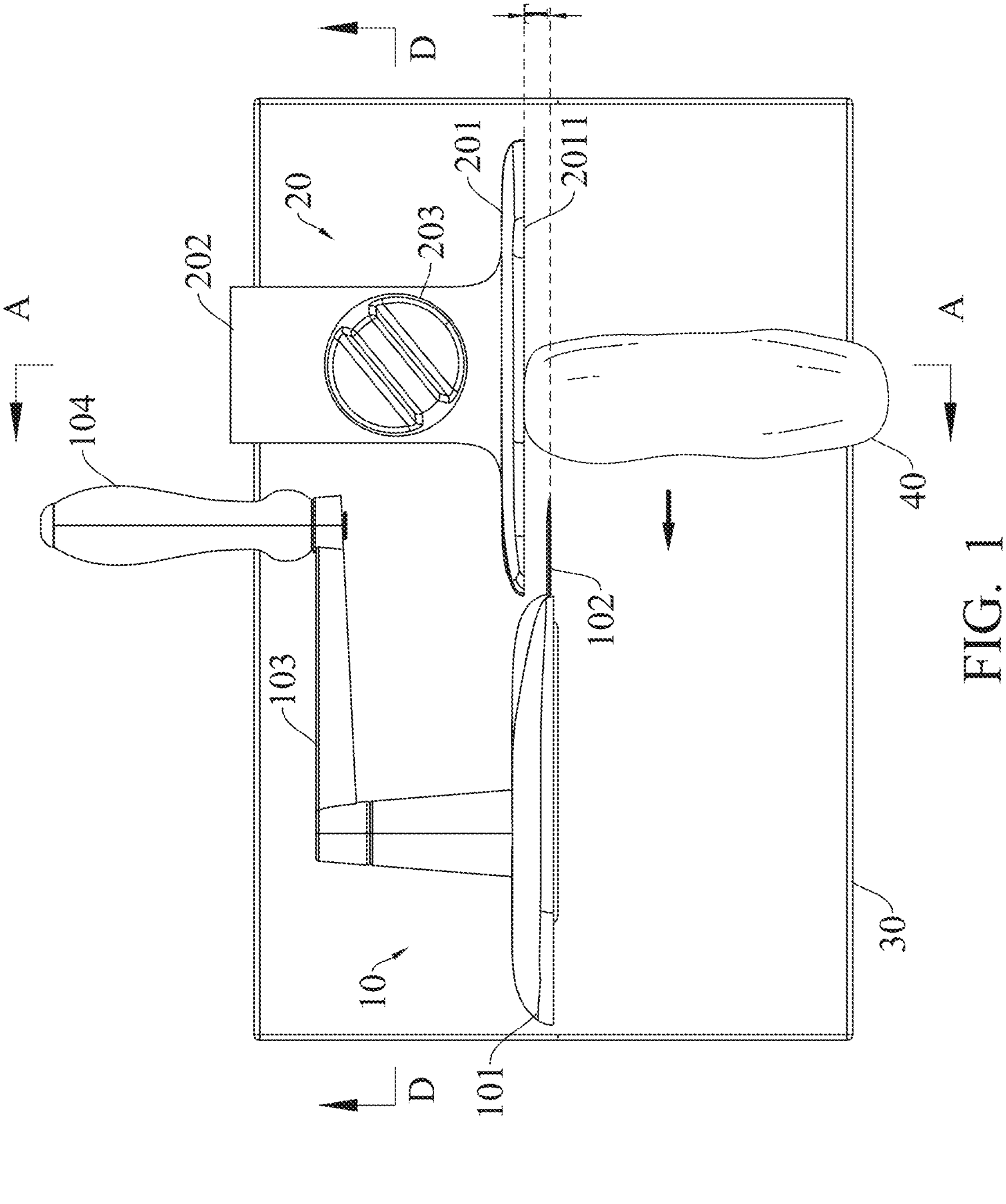
FIG. 1 is an overall schematic structural diagram of a bread slicer according to an embodiment of the present disclosure.
Figure 2:
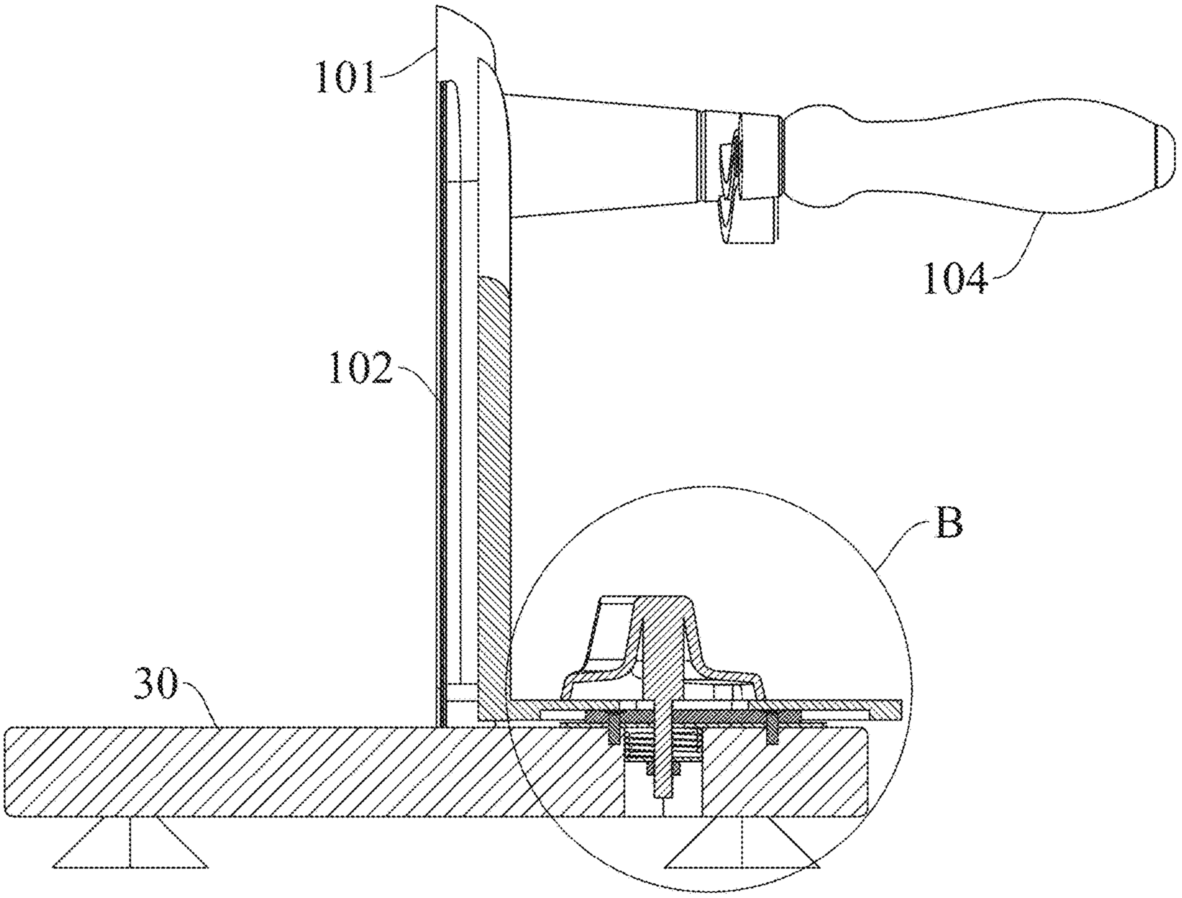
FIG. 2 is a cross-sectional view taken in a direction AA in FIG. 1.

Description of reference numerals: 10—cutting assembly; 101—housing; 102—cutter; 1021—second gear; 103—crank; 104—handle; 105—middle shaft; 106—first gear; 20—barrier assembly; 201—baffle; 2011—plate surface; 2012—arc-shaped end; 2013—flat end; 202—sliding plate; 2021—first chute; 2022—first elongated hole; 2023—second elongated hole; 2024—second guide rail; 203—knob; 2031—main shaft; 2032—nut; 2033—eccentric shaft; 2034—spring; 2035—gasket; 204—first guide rail; 2041—shaft hole; 211—first guiding structure; 212—second guiding structure; 30—bottom plate; 301—assembly hole; 302—suction cup; 303—bottom groove; 304—shaft hole; 305—second chute; 40—bread.

DETAILED DESCRIPTION OF THE EMBODIMENTS

The present disclosure will be described in detail with reference to the accompanying drawings and embodiments. Each example is provided as an explanation of the present disclosure and not as a limitation of the present disclosure. In fact, it will be clear to those skilled in the art that modifications and variations can be made to the present disclosure without departing from the scope or spirit of the present disclosure. For example, features shown or described as part of one embodiment may be used in another embodiment to produce yet another embodiment. Therefore, it is intended that the present disclosure includes such modifications and variations falling within the scope of the appended claims and their equivalents.

In the description of the present disclosure, the orientation or position relationship indicated by terms such as "longitudinal", "transverse", "upper", "lower", "front", "rear", "left", "right", "vertical", "horizontal", "top" and "bottom" is the orientation or position relationship shown based on the accompanying drawings. These terms are used solely for the convenience of describing the present disclosure, and do not require the present disclosure to be constructed or operated in a specific orientation, and therefore should not be construed as limitations on the present disclosure. The terms "connecting", "connected" and "arranging" used in the present disclosure should be broadly interpreted, which may, for example, refer to fixed connection or detachable connection, or direct connection or indirect connection through intermediate parts. For those skilled in the art, the specific meanings of the above terms can be understood according to the specific situation.

One or more examples of the present disclosure are shown in the accompanying drawings. In the detailed description, numeric and alphabetic reference signs are used to refer to features in the accompanying drawings. Similar or analogue reference signs in the accompanying drawings and the description have been used to refer to similar or analogue parts of the present disclosure. As used herein, the terms such as "first", "second" and "third" are used interchangeably to distinguish one component from another, and are not intended to indicate the position or importance of individual components.

As shown in FIG. 1, according to an embodiment of the present disclosure, a bread slicer is provided, which includes a cutting assembly 10. The cutting assembly 10 includes a housing 101 and a disc-shaped cutter 102 rotatably mounted on the housing 101. The housing 101 is mounted on a bottom plate 30. A disc surface of the cutter 102 is perpendicular to an upper surface of the bottom plate 30. When a bread 40 needs to be sliced, the bread 40 can be placed on an inlet side of the cutter 102 of the bottom plate 30. Then, the cutter 102 is rotated, and the bread 40 is moved toward the cutter 102. The bread 40 can be cut into two parts by the rotating cutter 102. A plane where the cutter 102 is located is defined as a cutting surface.

In order to control the thickness of the sliced bread 40, the present disclosure further includes a barrier assembly 20, which is arranged on an inlet side of the cutting assembly 10. The barrier assembly 20 includes a baffle 201 and a sliding plate 202. The sliding plate 202 is slidably arranged above the bottom plate 30. The baffle 201 is arranged at an end of the sliding plate 202 and is perpendicular to the bottom plate 30, and a plate surface 2011 of the baffle 201 is parallel to the cutting surface. As shown in FIG. 1, the bread 40 is placed on the bottom plate 30, and an end of the bread 40 abuts against the plate surface 2011 of the baffle 201 and is moved toward the cutter 102, so that the bread 40 can be cut into required slices. As shown in FIG. 1, the thickness of the sliced bread 40 is controlled by a distance T between the plate surface 2011 of the baffle 201 and the cutting surface. A sliding direction L2 of the sliding plate 202 is perpendicular to an intersection line L1 between the cutting surface and the bottom plate 30. By moving the sliding plate 202 in the sliding direction, the thickness of the bread 40 slices can be adjusted. For example, to achieve thinner slices, the baffle 201 needs to be moved toward the cutting surface, and for thicker slices, the baffle 201 needs to be moved away from the cutting surface. In some embodiments, the cutting surface is perpendicular to the bottom plate 30.

In order to control the distance between the plate surface 2011 of the baffle 201 and the cutting surface, in some embodiments, as shown in FIG. 3A, FIG. 3B, FIG. 4 and FIG. 7, a first guide rail 204 is fixedly arranged above the bottom plate 30. A longitudinal direction of the first guide rail 204 is the same as the sliding direction L2, both being perpendicular to the intersection line L1 between the cutting surface and the bottom plate 30. One side of the sliding plate 202 facing the bottom plate 30 is provided with a first chute 2021. The sliding plate 202 can be embedded into the first guide rail 204 through the first chute 2021 and slide reciprocally in the longitudinal direction of the first guide rail 204. The bottom plate 30 is provided with an assembly hole 301, and the first guide rail 204 is provided with a shaft hole 2041. An axis of the shaft hole 2041 is parallel to the cutting surface, and the shaft hole 2041 communicates with the assembly hole 301. The sliding plate 202 is provided with a first elongated hole 2022, and a longitudinal direction of the first elongated hole 2022 is perpendicular to the cutting surface. A knob 203 is arranged above the sliding plate 202, and a main shaft 2031 is arranged below the knob 203. In this embodiment, the main shaft 2031 is provided with external threads. The main shaft 2031 extends through the first elongated hole 2022, the shaft hole 2041 and the assembly hole 301 in sequence, and then the knob 203 is fixed on the bottom plate 30 by a nut 2032. At the same time, the sliding plate 202 is also limited between the knob 203 and the bottom plate 30. However, the first elongated hole 2022 of the sliding plate 202 has a certain length, allowing the sliding plate 202 to still move in the sliding direction, though the sliding range is limited by the length of the first elongated hole 2022 or/and a constraint range between the first guide rail 204 and the first chute 2021. The "constraint range between the first guide rail 204 and the first chute 2021" refers to, as shown in FIG. 9, in some embodiments, the limited length of the first chute 2021, where the first chute 2021 is embedded into the first guide rail 204, thereby restricting the sliding range of the sliding plate 202.

Figure 12:
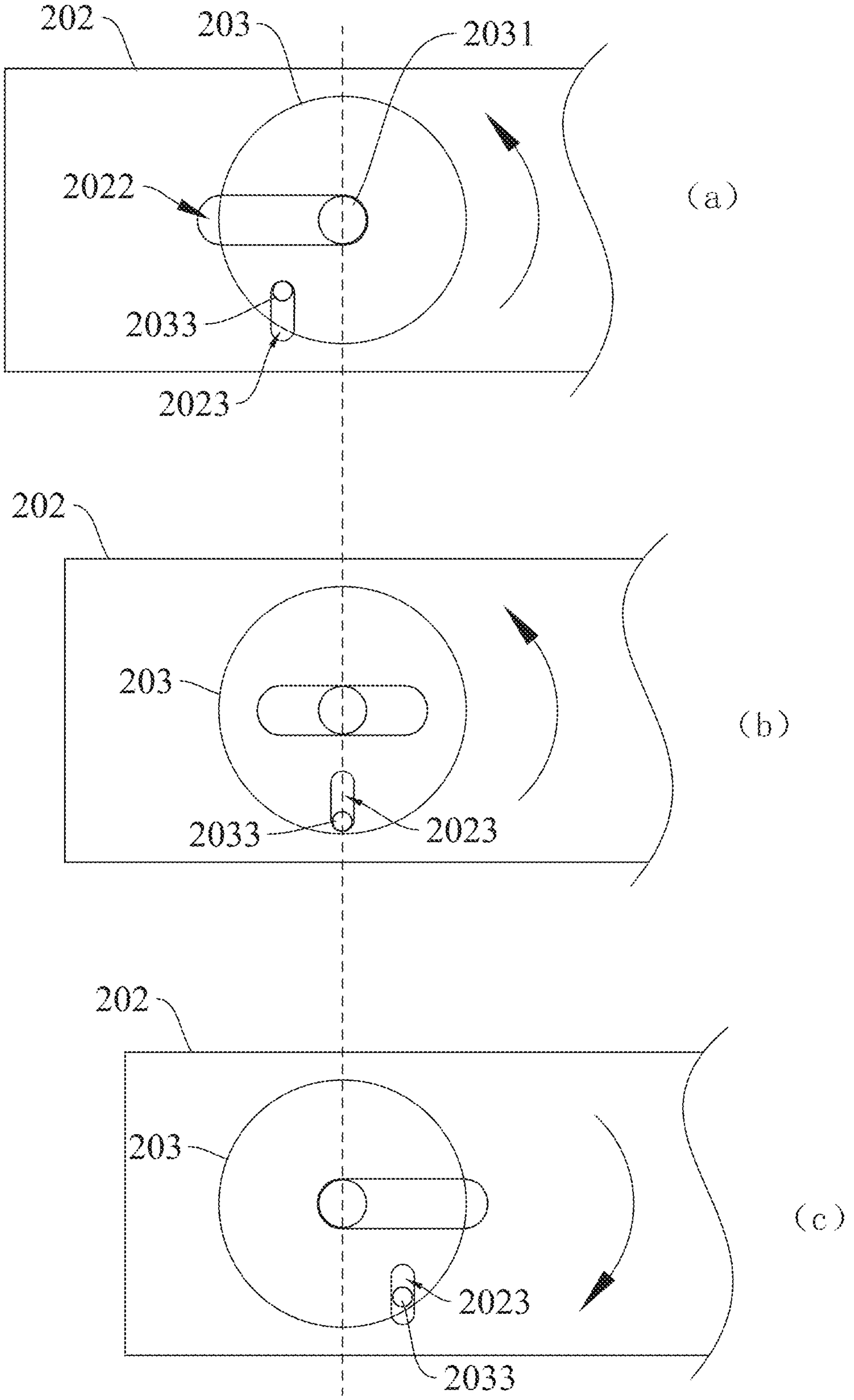
FIG. 12 is a schematic diagram illustrating a principle of a knob driving the movement of a sliding plate.

The sliding plate 202 is provided with a second elongated hole 2023. The second elongated hole 2023 is arranged on a side of the first elongated hole 2022 in the longitudinal direction the first elongated hole 2022 and between a first end and a second end in the longitudinal direction of the first elongated hole 2022. In this embodiment, the longitudinal direction of the second elongated hole 2023 is perpendicular to the longitudinal direction of the first elongated hole 2022. The knob 203 is provided with an eccentric shaft 2033 extending outward. The eccentric shaft 2033 is arranged at one side of the knob 203 facing the sliding plate 202. The eccentric shaft is inserted into the second elongated hole 2023 and is in clearance sliding fit with an inner wall of the second elongated hole 2023 in the longitudinal direction of the second elongated hole 2023. The eccentric shaft 2033 is as shown in FIG. 3A, FIG. 3B, FIG. 11 and FIG. 12, and the knob 203 is stationary relative to the bottom plate 30. By turning the knob 203, the eccentric shaft 2033 rotates around the main shaft 2031 of the knob 203, and the sliding plate 202 is driven to move in the sliding direction through the cooperation of the eccentric shaft 2033 and the second elongated hole 2023. FIG. 12 illustrates the movement of the sliding plate 202 driven by the knob 203. In the figure, the sliding plate 202 in (a) is located at the far left, and by turning the knob 203 in the direction of the arrow, the sliding plate 202 moves right to the state in (b). Continuing to turn the knob 203 in the direction of the arrow, the sliding plate 202 moves further right to the state in (c). During this process, the baffle 201 gradually approaches the cutting surface, and the sliced bread 40 gradually becomes thinner. By turning the knob 203 in an opposite direction during the above process, the baffle 201 can gradually move away from the cutting surface, and the sliced bread 40 gradually becomes thicker.

Figure 3A:
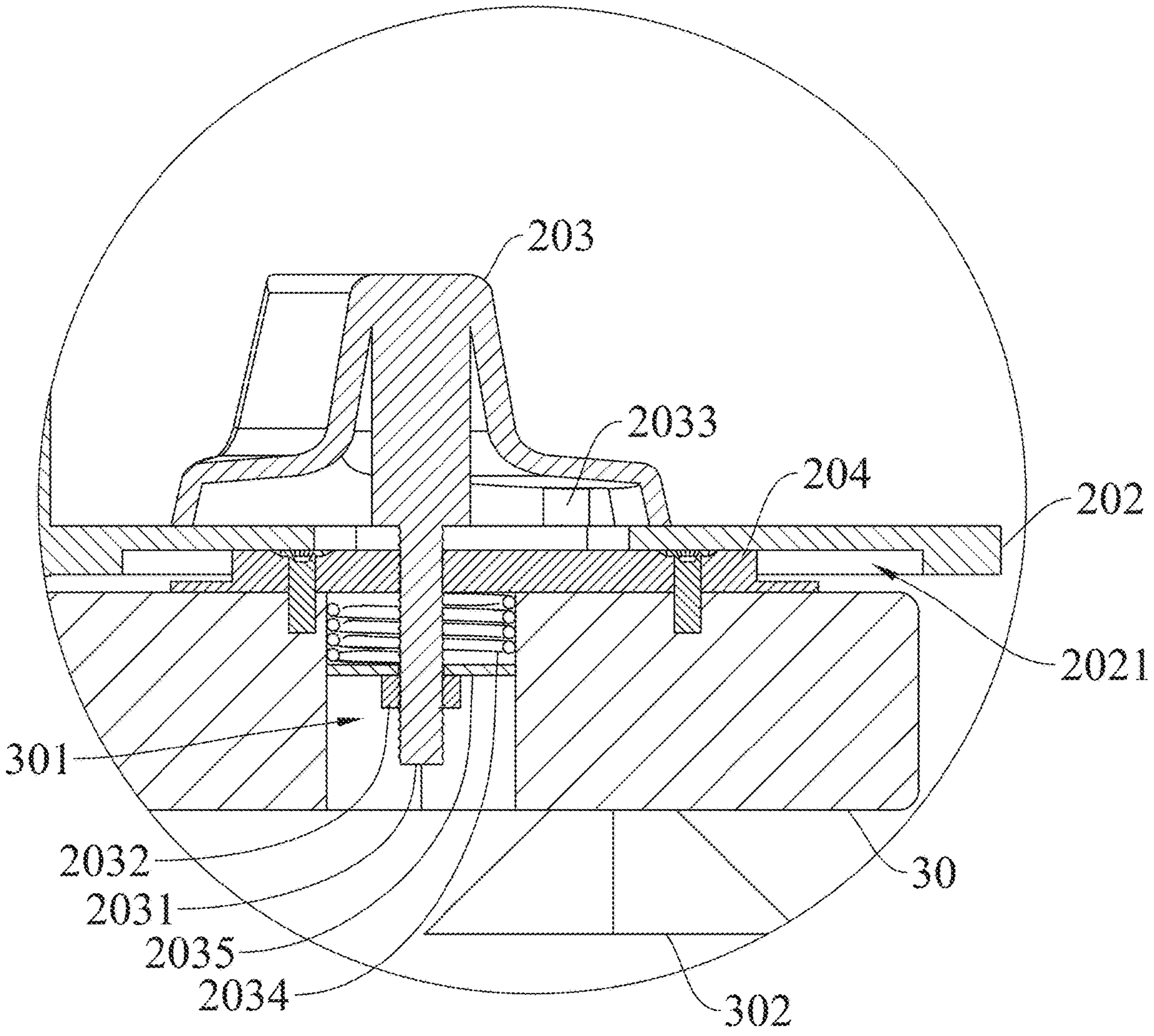
FIG. 3A is a partially enlarged schematic diagram at B in FIG. 2.
Figure 3B:
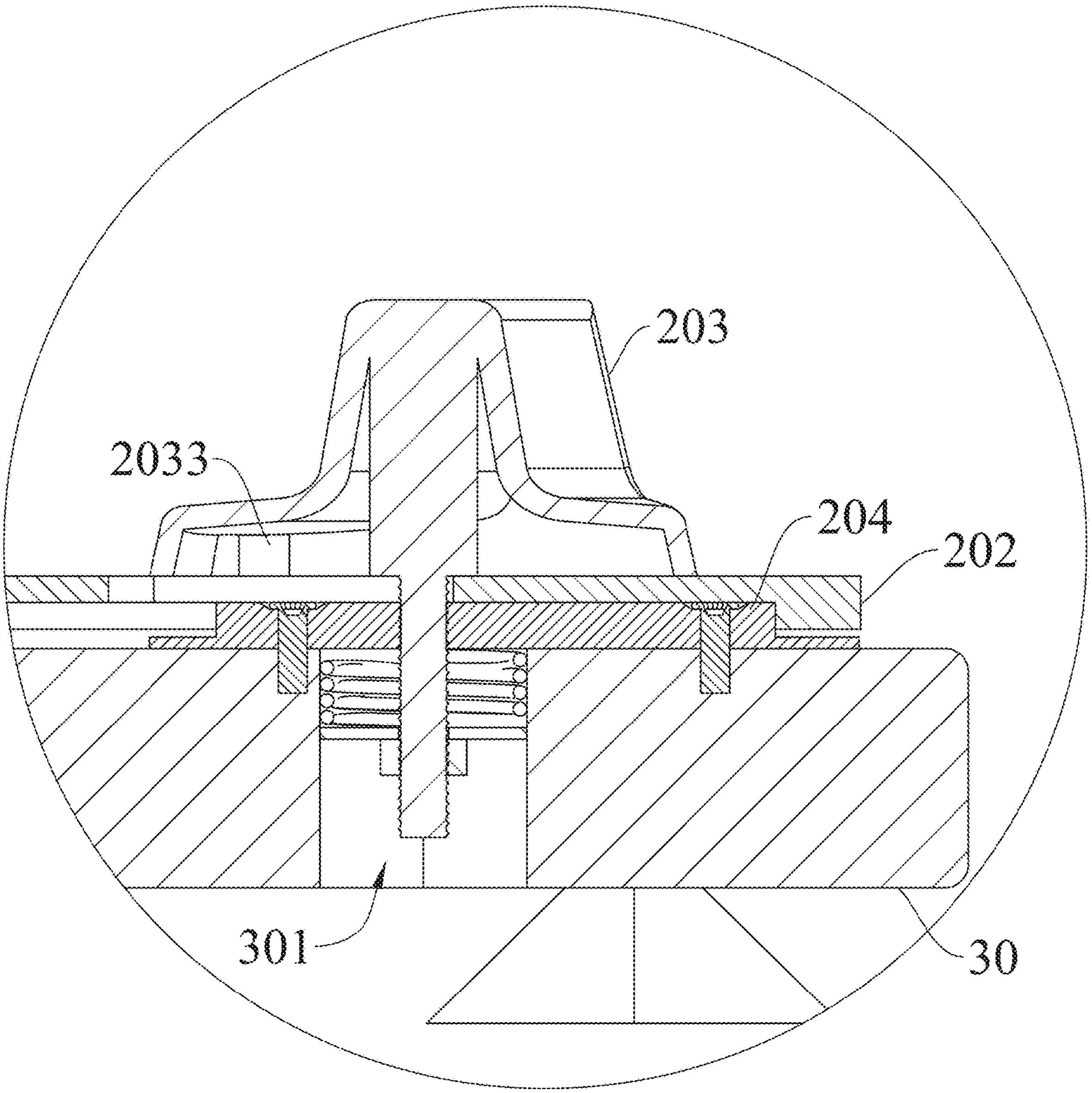
FIG. 3B is a schematic diagram illustrating a sliding plate moved to the left in FIG. 3.
Figure 4:
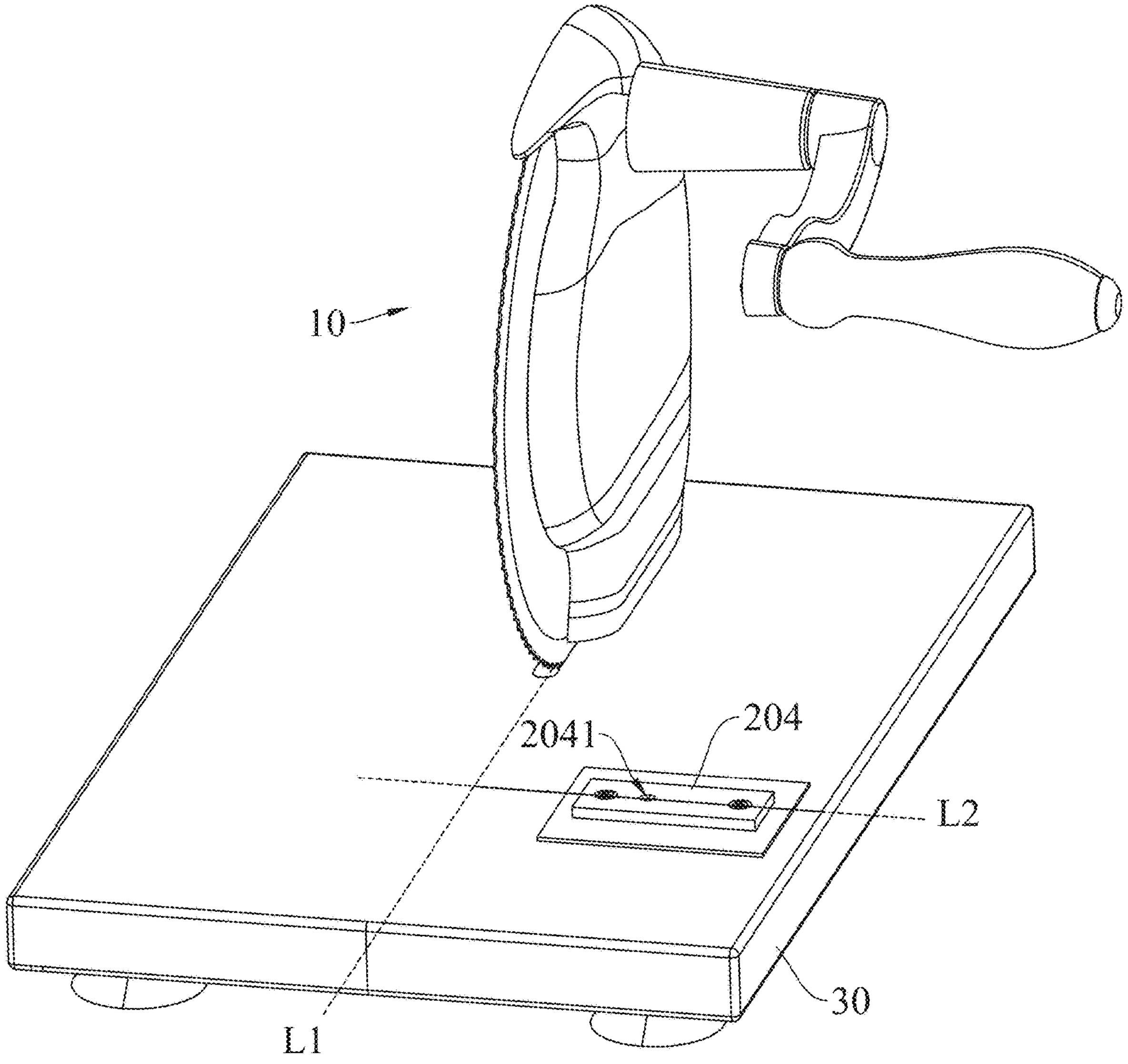
FIG. 4 is a schematic diagram of a bottom plate and a first guide rail according to an embodiment of the present disclosure.
Figure 5:
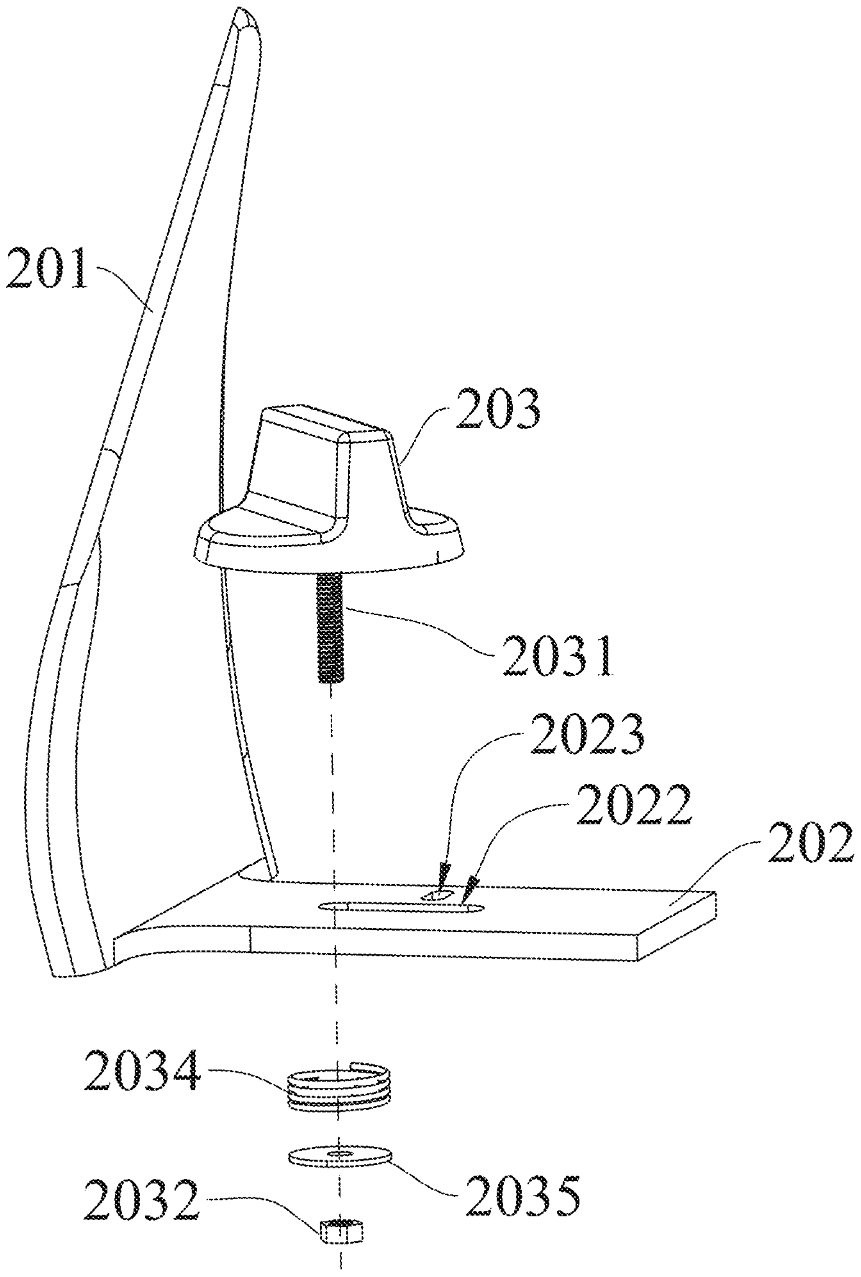
FIG. 5 is an exploded schematic diagram of a barrier assembly according to an embodiment of the present disclosure.
Figure 6:
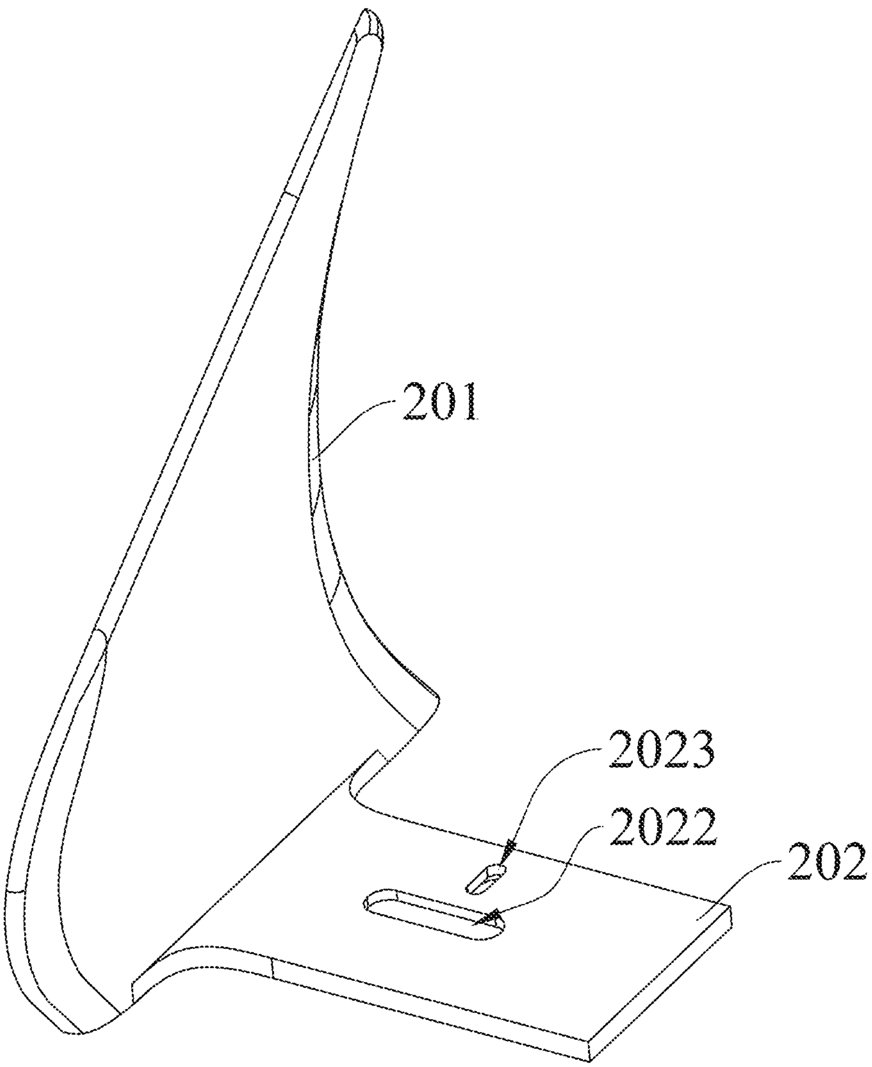
FIG. 6 is a schematic structural diagram of a baffle and a sliding plate according to an embodiment of the present disclosure.
Figure 7:
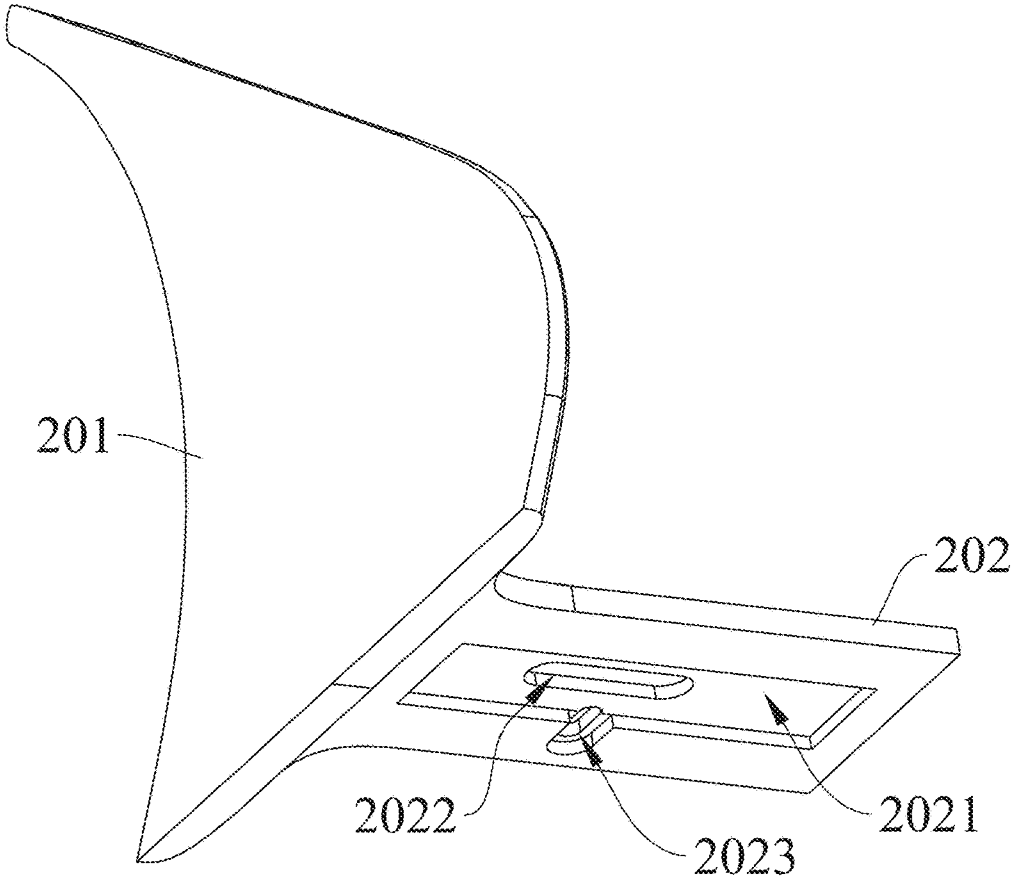
FIG. 7 is schematic diagram from another perspective of FIG. 6.
Figure 8:
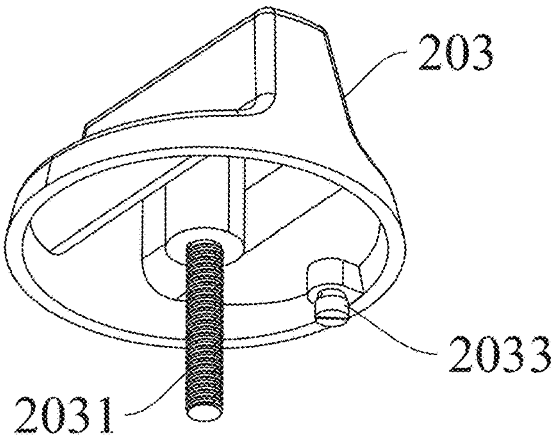
FIG. 8 is a schematic structural diagram of a knob according to an embodiment of the present disclosure.

As shown in FIG. 3A and FIG. 5, in some embodiments, a spring 2034 is sleeved onto the main shaft 2031 of the knob 203, and the spring 2034 is arranged between the first guide rail 204 and a nut 2032. The spring 2034 still allows relative movement between the knob 203 and the sliding plate 202, as well as between the sliding plate 202 and the first guide rail 204, while ensuring a close fit. In this embodiment, a gasket 2035 is further provided between the spring 2034 and the nut 2032. If an inner diameter of the spring 2034 is smaller than an outer diameter of the nut 2032, the gasket 2035 can be removed without affecting the function of the spring 2034.

Figure 9:
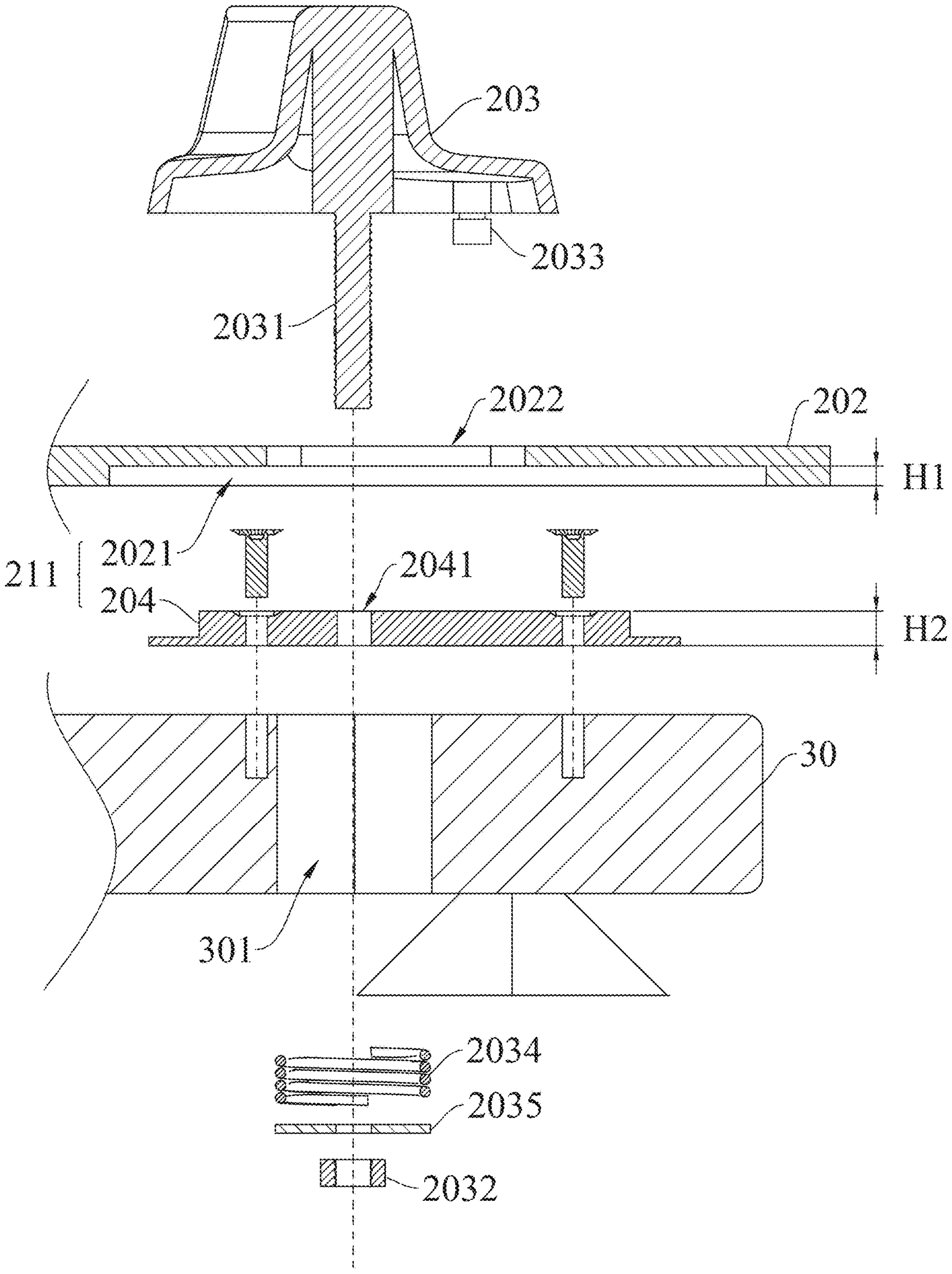
FIG. 9 is an exploded schematic diagram of a barrier assembly in a cross-sectional view in FIG. 2.
Figure 10:
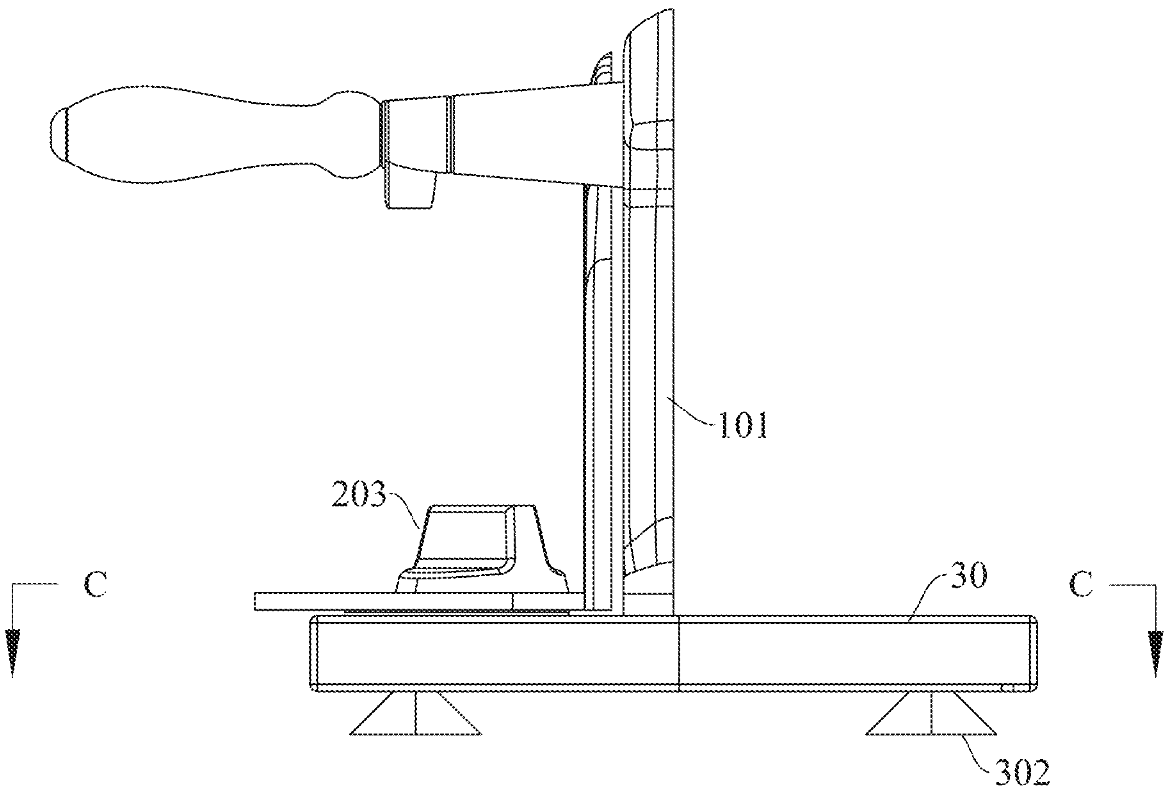
FIG. 10 is a schematic structural diagram of a bread slicer according to an embodiment of the present disclosure from another perspective.
Figure 11:
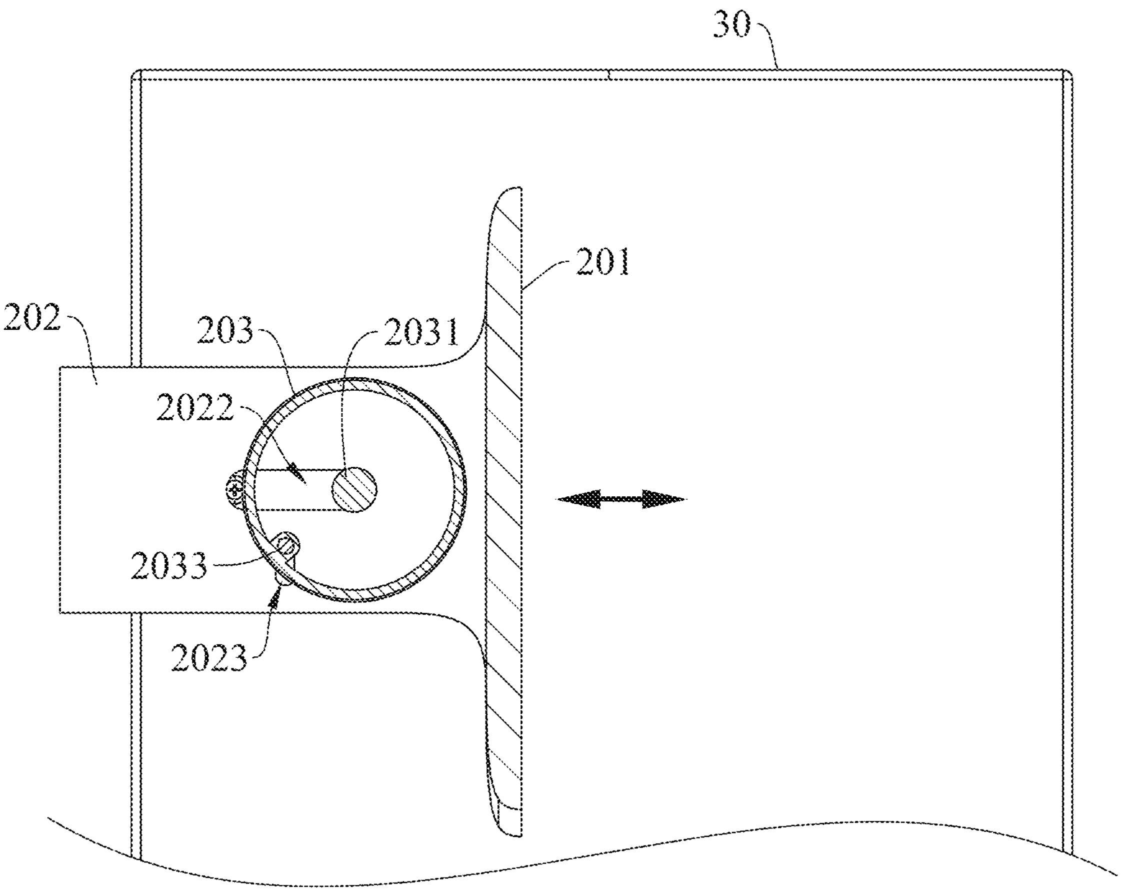
FIG. 11 is a cross-sectional view taken in a direction of CC in FIG. 10.

As shown in FIG. 9, in some embodiments, a height H1 (depth) of the first chute 2021 is smaller than a height H2 of the first guide rail 204. When the sliding plate 202, the first guide rail 204 and the bottom plate 30 are assembled, a height difference between the first guide rail 204 and the first chute 2021 can leave a gap between the sliding plate 202 and the bottom plate 30. When the sliding plate 202 slides in the sliding direction, a sliding friction surface of the sliding plate 202 is a contact surface between the first guide rail 204 and the sliding plate 202, and the area of the contact surface is smaller than the total area of a side, facing the bottom plate 30, of the sliding plate 202. Therefore, a resistance encountered by the sliding plate 202 during movement is reduced, allowing the sliding plate 202 to slide more smoothly.

Figure 14:
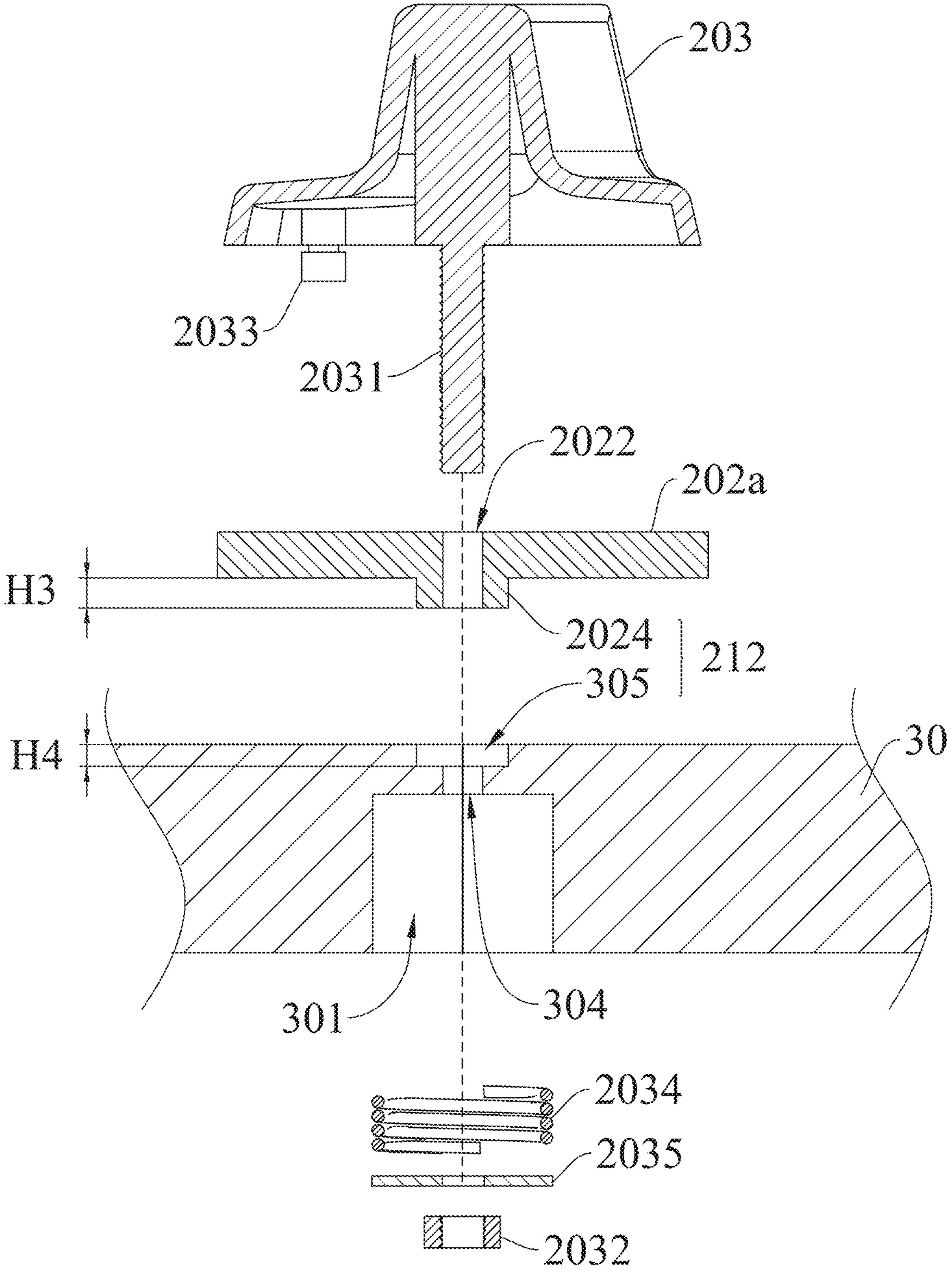
FIG. 14 is a cross-sectional view taken in a direction of DD in FIG. 1, illustrating a schematic diagram of a second guiding structure.
Figure 15:
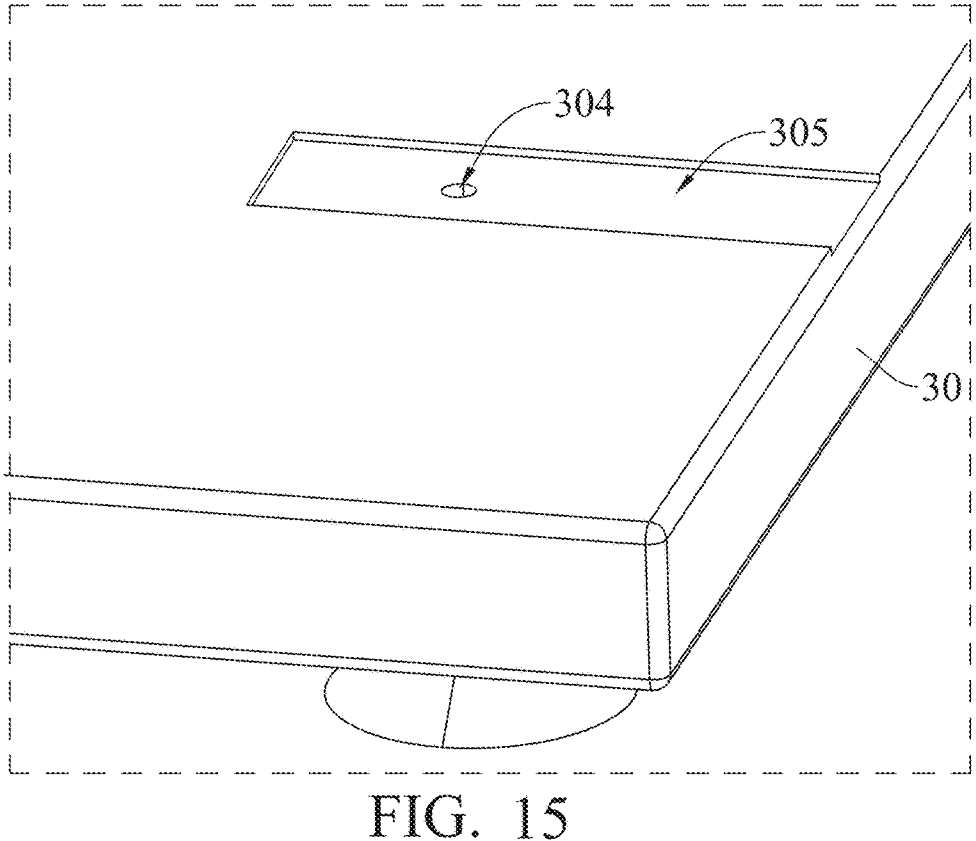
FIG. 15 is a schematic layout diagram of a bread slicer according to an embodiment of the present disclosure, illustrating a structure of a bottom plate and a second chute of a second guiding structure.
Figure 16:
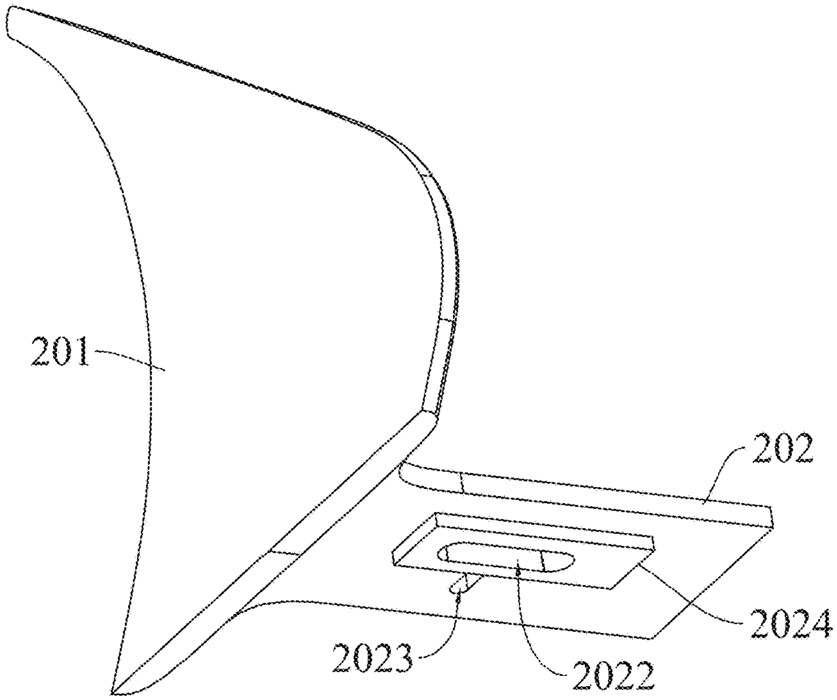
FIG. 16 is a schematic structural diagram of a bottom of a sliding plate of a second guiding structure according to an embodiment of the present disclosure.

In the above embodiment, the first guide rail 204 and the first chute 2021 together form a first guiding structure 211, which restricts the sliding plate 202 to move in the sliding direction. The first guiding structure 211 may also be implemented in other manners. For example, in some embodiments, as shown in FIG. 14 to FIG. 16, a second guiding structure 212 between another sliding plate 202 and the bottom plate 30 is shown. The second guiding structure 212 includes a second chute 305 recessed into the bottom plate 30. The longitudinal direction of the second chute 305 is the same as the sliding direction. The second chute 305 is provided with a shaft hole 304. The shaft hole 304 communicates with the assembly hole 301, and a radius of the shaft hole 304 is smaller than that of the assembly hole 301. A side, facing the bottom plate 30, of the second chute 305 is provided with a second guide rail 2024. The second guide rail 2024 is embedded into the second chute 305 and is able to slide in the second chute 305. The first elongated hole 2022 extends through the second guide rail 2024. The main shaft 2031 of the knob 203 extends through the first elongated hole 2022, the shaft hole 304 and the assembly hole 301 in sequence, and then the knob 203 is fixed on the bottom plate 30 by the nut 2032. The sliding plate 202 is also provided with the second elongated hole 2023 described above, and the knob 203 is also provided with the eccentric shaft 2033 described above. Under the restriction of the second guide rail 2024 and the second chute 305, turning the knob 203 enables the sliding plate 202 to move in the sliding direction. In addition, the spring 2034 in the foregoing embodiment may also be provided in this embodiment.

As shown in FIG. 14, in the second guiding structure 212, a height H3 of the second guide rail 2024 is greater than a height H4 (depth) of the second chute 305. A height difference between the second guide rail 2024 and the second chute 305 can leave a gap between the sliding plate 202 and the bottom plate 30. For the purpose, refer to a height relationship between the first guide rail 204 and the first chute 2021 in the first guiding structure 211, which will not be elaborated further here.

Figure 13:
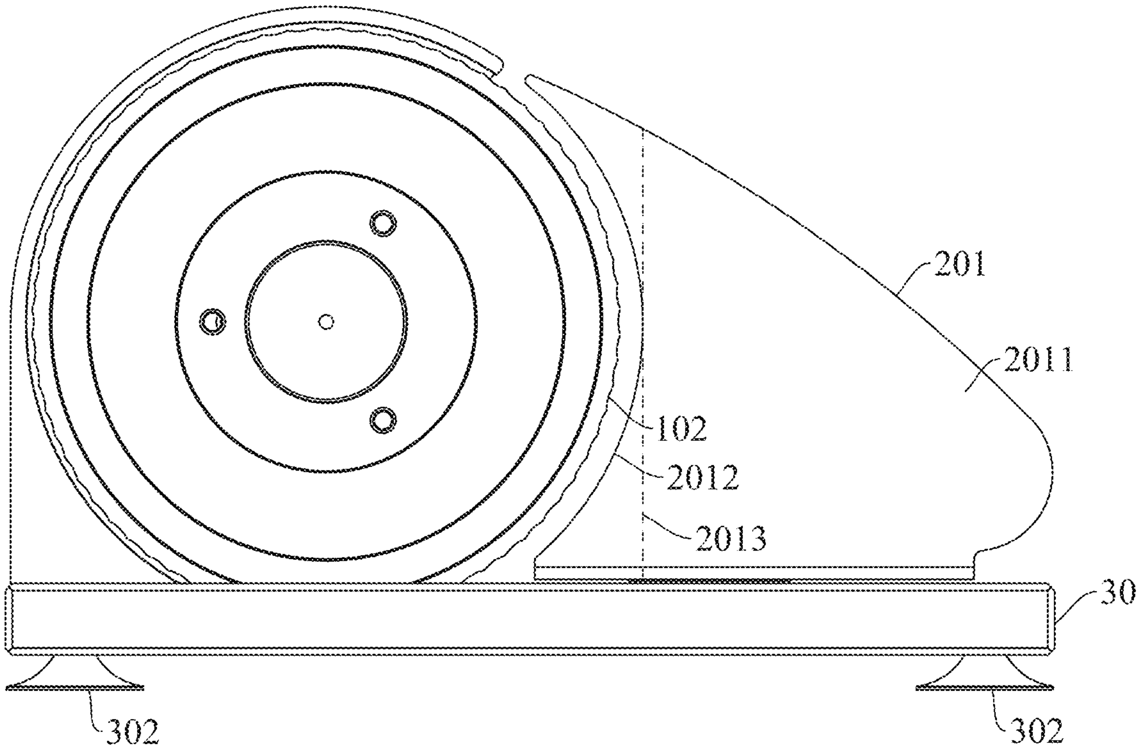
FIG. 13 is a schematic structural diagram of a bread slicer according to an embodiment of the present disclosure from another perspective.

As shown in FIG. 13, in some embodiments, a side, facing the cutter 201, of the baffle 201 is an arc-shaped end 2012. An edge of the arc-shaped end 2012 is in clearance fit with an outer edge of the cutter 102. The arc-shaped end 2012 is capable of accommodating at least a part of the cutter 102. Compared with a flat end 2013, the arc-shaped end 2012 can increase a supporting area of the baffle 201 for the bread 40.

The cutter 102 in the cutting assembly 10 can be electrically or manually driven. The electric drive has the advantages of saving physical strength, but has a complex structure and a high cost. The manual drive has the advantages of a simpler structure and a low cost, but consumes some physical strength.

Figure 17:
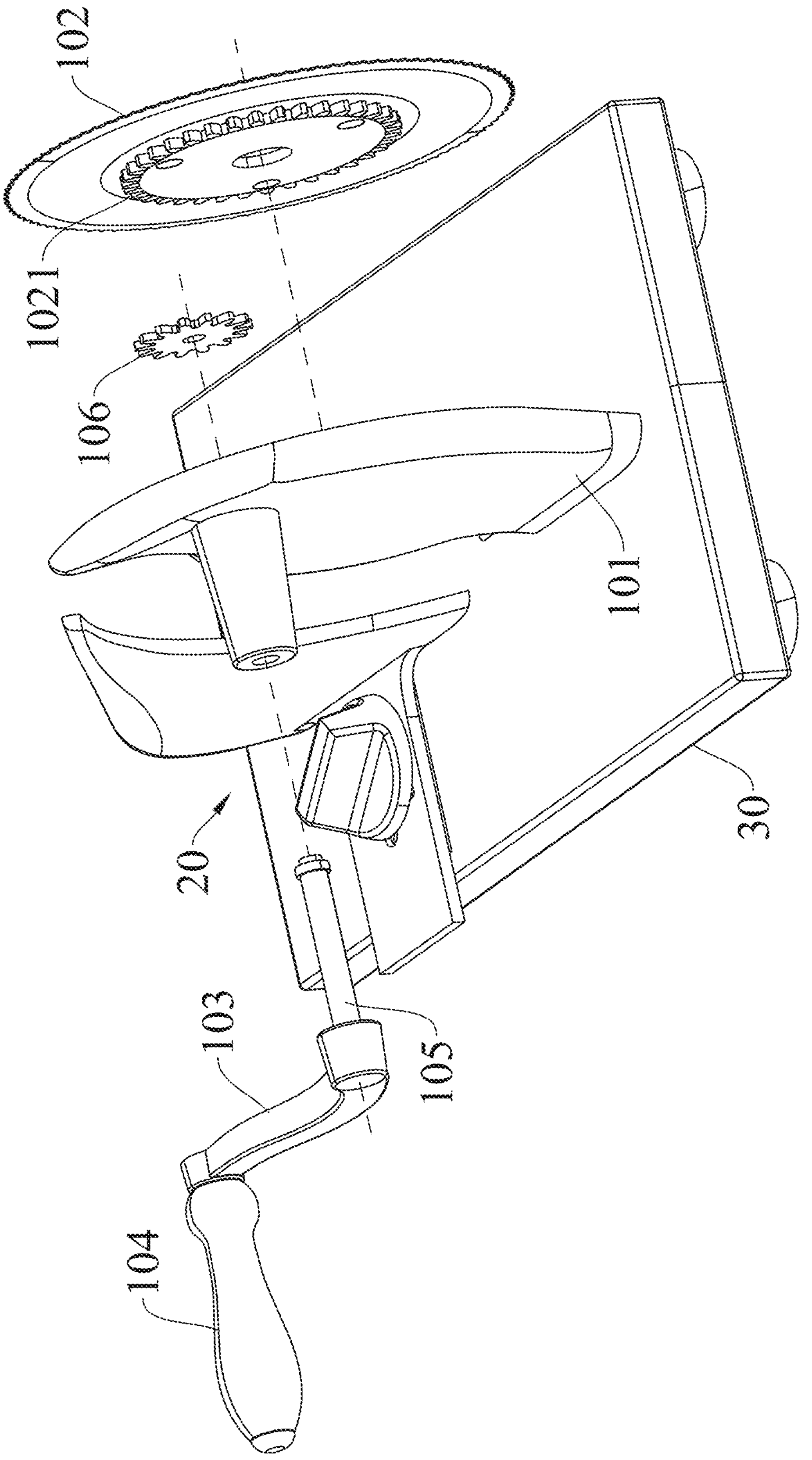
FIG. 17 and FIG. 18 are exploded schematic diagrams of a cutting assembly according to an embodiment of the present disclosure.
Figure 18:
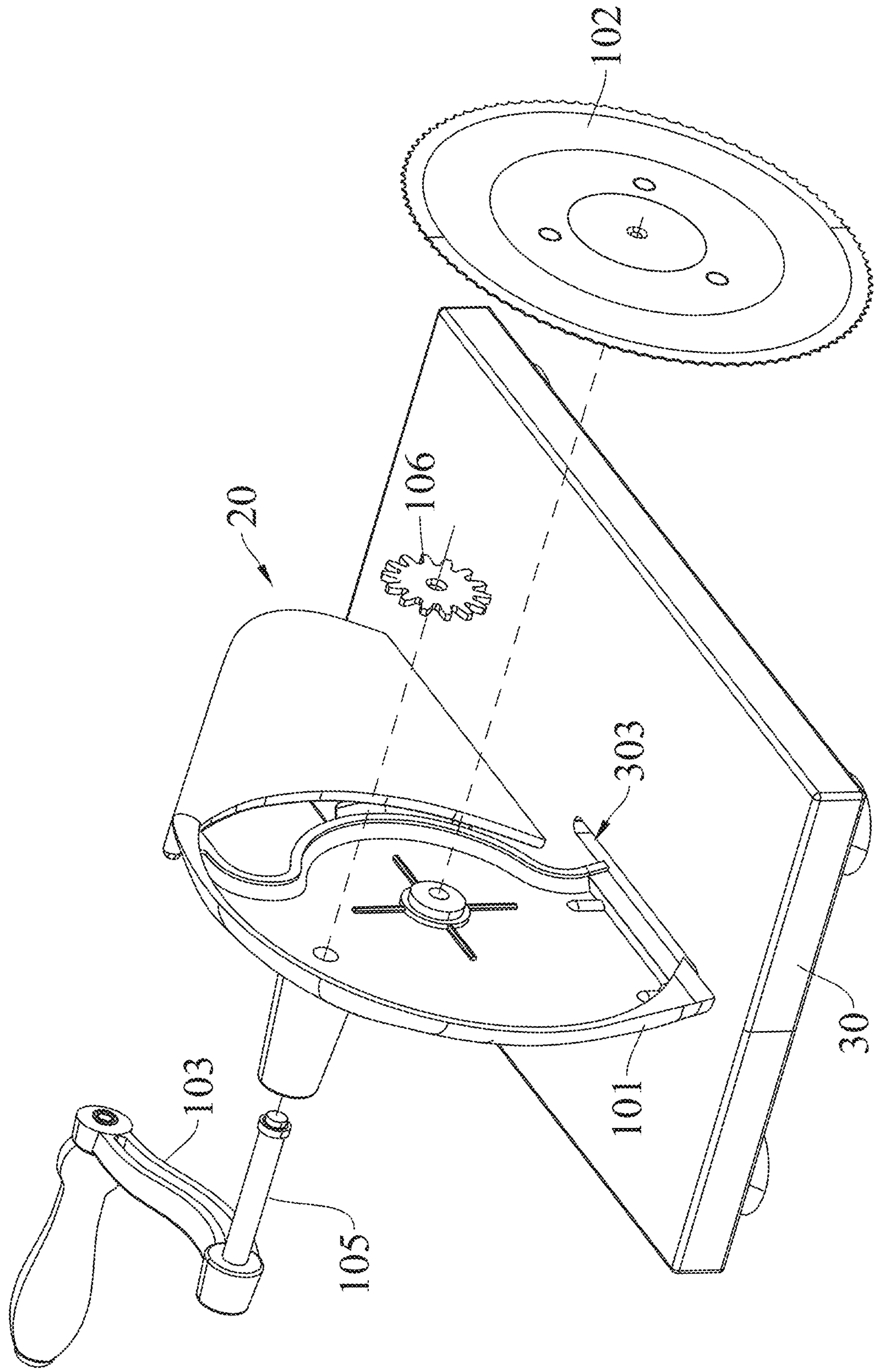

As shown in FIG. 17 and FIG. 18, in some embodiments, a manual drive structure is provided, which includes a middle shaft 105. The middle shaft 105 is rotatably connected to the housing 101, and a first end and a second end of the middle shaft 105 are located at two sides of the housing 101. A first gear 106 is assembled at the first end, facing the cutter 102, of the middle shaft 105. A second end of the middle shaft 105 is connected to a first end of the crank 103, and a second end of the crank 103 is provided with a handle 104. A coaxial second gear 1021 is arranged at one side of the cutter 102 facing the housing 101. The second gear 1021 is fixedly connected to the cutter 102, and the second gear 1021 is meshed with the first gear 106. Holding the handle 104 can drive the middle shaft 105 to rotate, which drives the first gear 106 to drive the second gear 1021 and the cutter 102 to rotate. In this embodiment, a radius of the first gear 106 is smaller than that of the second gear 1021, which can reduce the user requirement for strength to meet different groups of people. Meanwhile, the output speed is also reduced, and the output torque is increased.

As shown in FIG. 13 and FIG. 18, in some embodiments, the bottom plate 30 is provided with a bottom groove 303, and a part of the cutter 102 is capable of being accommodated in the bottom groove 303. The distance between the cutter 102 and the bottom plate 30 is smaller than 0 (being a negative value when the cutter 102 is embedded into the bottom plate 30). The purpose is to ensure that the bread 40 can be completely sliced after passing through the cutter 102.

As shown in FIG. 13, in some embodiments, a suction cup 302 is provided at the bottom of the bottom plate 30. The bottom plate 30 can be adsorbed onto a surface of an operation table through the suction cup 302, which can improve the stability of the bread slicer of the present disclosure during use. Moreover, the bread slicer can be removed from the operating table at any time after use. The advantages of the suction cup 302 lie in quick assembly or disassembly, temporary and reusable nature, and flexibility in position replacement, and no damage to the surface of the operation table.

The above are only some embodiments of the present disclosure, rather than limit the present disclosure. For those skilled in the art, various modifications and variations can be made to the present disclosure. Any modifications, equivalent substitutions, improvements, etc. made within the spirit and the principle of the present disclosure shall be included within the protection scope of the present disclosure.

What is claimed is:

1. A bread slicer, comprising a bottom plate (30) and a cutting assembly (10), wherein the cutting assembly (10) comprises a support body and a cutter (102) rotatably arranged on the support body, and the support body is fixedly arranged above the bottom plate (30), wherein:

a barrier assembly (20) is arranged above the bottom plate (30), and the barrier assembly (20) comprises:

a sliding plate (202) slidably arranged above the bottom plate (30) and defining a first elongated hole (2022) and a second elongated hole (2023), wherein the second elongated hole (2022) is arranged on a side of the first elongated hole (2022) in a longitudinal direction of the first elongated hole (2022) and between two ends of the first elongated hole (2022);

a baffle (201) erected above the bottom plate (30), wherein one end of the baffle (201) facing the bottom plate (30) is connected to the sliding plate (202);

a guiding structure comprising a first guiding member and a second guiding member, wherein the first guiding member is arranged on the bottom plate (30), the second guiding member is arranged on the sliding plate (202), and the first guiding member and the second guiding member are in sliding fit and limit a sliding direction of the sliding plate (202) on the bottom plate (30); and a knob (203) arranged above the sliding plate (202), wherein one side of the knob (203) facing the sliding plate (202) is provided with a main shaft (2031) and an eccentric shaft (2033), an end of the main shaft (2031) extends through the first elongated hole (2022) and is rotatably connected to the bottom plate (30), and the eccentric shaft (2033) is inserted into the second elongated hole (2023) and is capable of sliding in a longitudinal direction of the second elongated hole (203) in a clearance fitting manner;

wherein turning the knob (203) allows the eccentric shaft (2033) to rotate around the main shaft (2031) and drives the sliding plate (202) to move in the sliding direction, such that the baffle (201) is capable of selectively adjusting a distance between a plate surface (2011) of the baffle and a cutting surface where the cutter (102) is located.

2. The bread slicer according to claim 1, wherein:

the first guiding member is arranged at one side of the bottom plate (30) facing the sliding plate (202), and the first guiding member is defined with a shaft hole (2041); and the second guiding member is arranged at one side of the first elongated hole (2022) of the sliding plate (202) facing the bottom plate (30), and the main shaft (2031) of the knob (203) extends through the first elongated hole (2022) and the shaft hole (2041) and is rotatably connected to the bottom plate (30).

3. The bread slicer according to claim 2, wherein:

the bottom plate (30) is defined with an assembly hole (301), the main shaft (2031) of the knob (203) extends into the assembly hole (301), a spring (2034) is sleeved onto an outer side of the main shaft (2031), one end of the spring (2034) is configured to act on an end of the main shaft (2031), and another end of the spring (2034) is configured to act on the first guiding member.

4. The bread slicer according to claim 2, wherein:

the first guiding member comprises a first guide rail (204) extending outward; and the second guiding member comprises a first chute (2021) recessed inward.

5. The bread slicer according to claim 4, wherein:
the first guide rail (204) is detachably mounted above the bottom plate (30).

6. The bread slicer according to claim 4, wherein:
a height of the first guide rail (204) is greater than a depth of the first chute (2021), allowing a gap to be reserved between the sliding plate (202) and the bottom plate (30).

7. The bread slicer according to claim 2, wherein:
the first guiding member defines a second chute (305) recessed inward; and
the second guiding member comprises a second guide rail (2024) extending outward.

8. The bread slicer according to claim 7, wherein:
a height of the second guide rail (2024) is greater than a depth of the second chute (305), allowing a gap to be reserved between the sliding plate (202) and the bottom plate (30).

9. The bread slicer according to claim 1, wherein:
the longitudinal direction of the second elongated hole (2023) is perpendicular to the longitudinal direction of the first elongated hole (2022).

10. The bread slicer according to claim 1, wherein:
the first elongated hole (2022) and the second elongated hole (2023) are separated from each other.

11. The bread slicer according to claim 1, wherein:
the baffle (201) is arranged at one end, facing the cutting surface, of the sliding plate (202).

12. The bread slicer according to claim 1, wherein:
one end, facing the cutter (102), of the baffle (201) is an arc-shaped end (2012), and the arc-shaped end (2012) is capable of accommodating at least a part of the cutter (102).

13. The bread slicer according to claim 1, wherein:
a suction cup (302) is arranged below the bottom plate (30).

14. The bread slicer according to claim 1, wherein:
the bottom plate (30) is defined with a bottom groove (303), and a part of the cutter (102) is capable of being accommodated in the bottom groove (303).

15. The bread slicer according to claim 1, wherein:
the sliding direction is perpendicular to an intersection line (L1) between the cutting surface and the bottom plate (30).

16. The bread slicer according to claim 1, wherein:
the cutting surface is perpendicular to the bottom plate (30).

17. The bread slicer according to claim 1, wherein:
the cutting assembly (10) further comprises a middle shaft (105), the middle shaft (105) is rotatably connected to the support body, a first end and a second end of the middle shaft (105) are located at two sides of the support body, and a first gear (106) is arranged at the first end of the middle shaft (105); and
a coaxial second gear (1021) is arranged at one side of the cutter (102) facing the support body, the second gear (1021) is fixedly connected to the cutter (102), and the second gear (1021) is meshed with the first gear (106).

18. The bread slicer according to claim 17, wherein:
the second end of the middle shaft (105) is fixedly connected to a first end of the crank (103), and a second end of the crank (103) is provided with a handle (104).

* * * * *